United States Patent
Adamson et al.

(10) Patent No.: US 9,896,219 B2
(45) Date of Patent: Feb. 20, 2018

(54) FLOW INLET

(71) Applicant: The Boeing Company, Chicago, IL (US)

(72) Inventors: Eric E Adamson, Newcastle, WA (US); Spencer Robert Fugal, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 232 days.

(21) Appl. No.: 14/627,509

(22) Filed: Feb. 20, 2015

(65) Prior Publication Data

US 2016/0244177 A1  Aug. 25, 2016

(51) Int. Cl.
B64D 33/02 (2006.01)
F02C 7/04 (2006.01)

(52) U.S. Cl.
CPC ............... B64D 33/02 (2013.01); F02C 7/04 (2013.01); *B64D 2033/026* (2013.01); *F05D 2220/80* (2013.01); *F05D 2250/14* (2013.01); *Y02T 50/672* (2013.01)

(58) Field of Classification Search
CPC .. F02C 7/04; F05D 2250/14; B64D 2033/026
See application file for complete search history.

(56) References Cited

U.S. PATENT DOCUMENTS

| | | | |
|---|---|---|---|
| 4,012,013 A | 3/1977 | Ball et al. | |
| 5,881,758 A | 3/1999 | Koncsek et al. | |
| 6,793,175 B1 | 9/2004 | Sanders et al. | |
| 7,631,836 B2 * | 12/2009 | Lebas | B64C 30/00 137/15.1 |
| 8,286,434 B2 * | 10/2012 | Henne | B64D 33/02 137/15.1 |
| 2009/0107557 A1 | 4/2009 | Conners | |

FOREIGN PATENT DOCUMENTS

| | | |
|---|---|---|
| RU | 2343297 C1 | 1/2009 |
| WO | 2007/051137 A2 | 5/2007 |

OTHER PUBLICATIONS

European Search Report for EP 16154793, Jun. 16, 2016.

* cited by examiner

*Primary Examiner* — Brian M O'Hara
(74) *Attorney, Agent, or Firm* — Patterson + Sheridan, LLP

(57) ABSTRACT

An apparatus is formed of a cowl and a flow inlet formed on an interior surface of the cowl. The flow inlet has a supersonic compression section attached to a subsonic diffusion section at a throat. The supersonic compression section includes an at least partially elliptical compression ramp which extends along an approximately 180 degree arc along the interior surface. The flow inlet may form part of an aircraft. A method of air flow using the flow inlet is also disclosed.

20 Claims, 4 Drawing Sheets

FLOW INLET

FIELD OF THE DISCLOSURE

The disclosure relates to flow inlets, and particularly to flow inlets for aircraft engines.

BACKGROUND OF THE DISCLOSURE

Existing 2-D flow inlets, such as in the F-15 and the F-14, for diffusing supersonic airflow to subsonic airflow entering an engine typically experience higher weight and drag than comparable axisymmetric flow inlets due to pressure loads on flat panels and overall larger surface area. They also may experience undesirable pressure distortion and inadequate total pressure recovery associated with the real flow physics of their corners. Bump inlet designs, such as in the F-22, may improve weight and drag, but often experience poor recoveries. Existing axisymmetric inlets, such as in the MiG-21, typically do not provide the same stability margins and tolerance to changes in the onset flow angle as 2-D flow inlets. Existing half-round inlets, such as in the Mirage III, often create integration issues for podded nacelle installations because the inlet aperture is wider than the engine cowl at the fan face. Typically, in the design of aircraft, one of the above-referenced designs is used which may add weight or reduce performance.

There is a need for a flow inlet which will improve upon one or more issues experienced by one or more of the existing flow inlets.

SUMMARY OF THE DISCLOSURE

In one embodiment, a flow inlet is disclosed. The flow inlet is formed on an interior surface of a cowl. The flow inlet has a supersonic compression section attached to a subsonic diffusion section at a throat. The supersonic compression section includes an at least partially elliptical compression ramp which extends along an approximately 180 degree arc along the interior surface. The flow inlet may form part of an aircraft.

In another embodiment, an aircraft is disclosed. The aircraft includes a flow inlet formed on an interior surface of a cowl. The flow inlet has a supersonic compression section attached to a subsonic diffusion section at a throat. The supersonic compression section includes an at least partially elliptical compression ramp which extends along an approximately 180 degree arc along the interior surface. The flow inlet may form part of an aircraft. A method of air flow using the flow inlet is also disclosed.

In still another embodiment, a method of diffusing airflow is disclosed. In one step, airflow is flowed into a supersonic compression section of a flow inlet formed on an interior surface of a cowl. The supersonic compression section is formed of an at least partially elliptical compression ramp which extends along an approximately 180 degree arc along the interior surface. In another step, the airflow is compressed as it flows through the flow inlet.

These and other features, aspects and advantages of the disclosure will become better understood with reference to the following drawings, description and claims. This summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION OF THE DISCLOSURE

Figure 1:
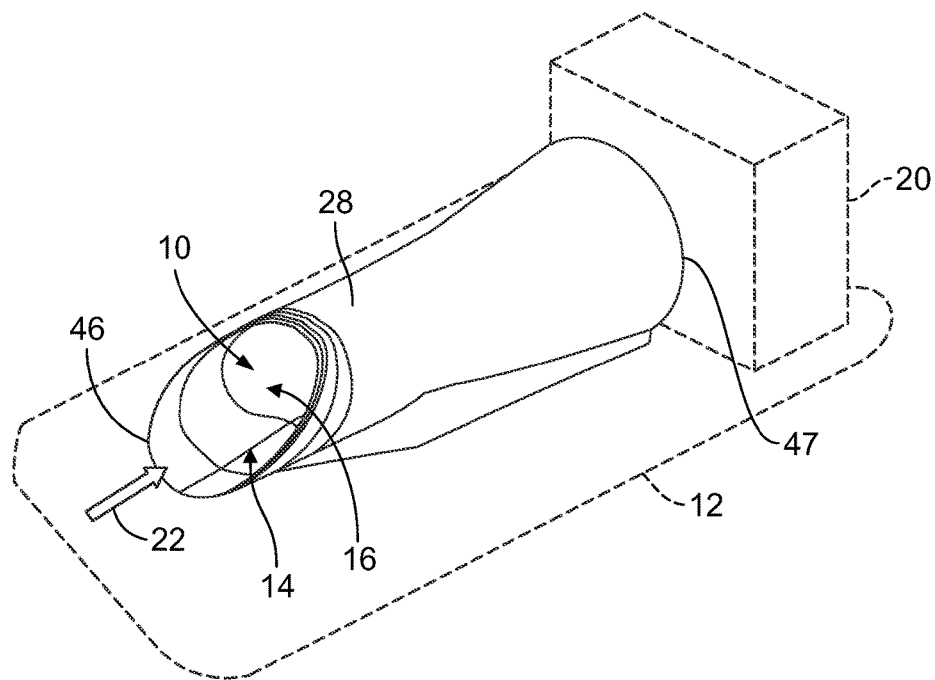
FIG. 1 is a diagrammatic representation of a perspective view of an embodiment of a flow inlet attached to an aircraft and an engine of the aircraft.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure. The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 2:
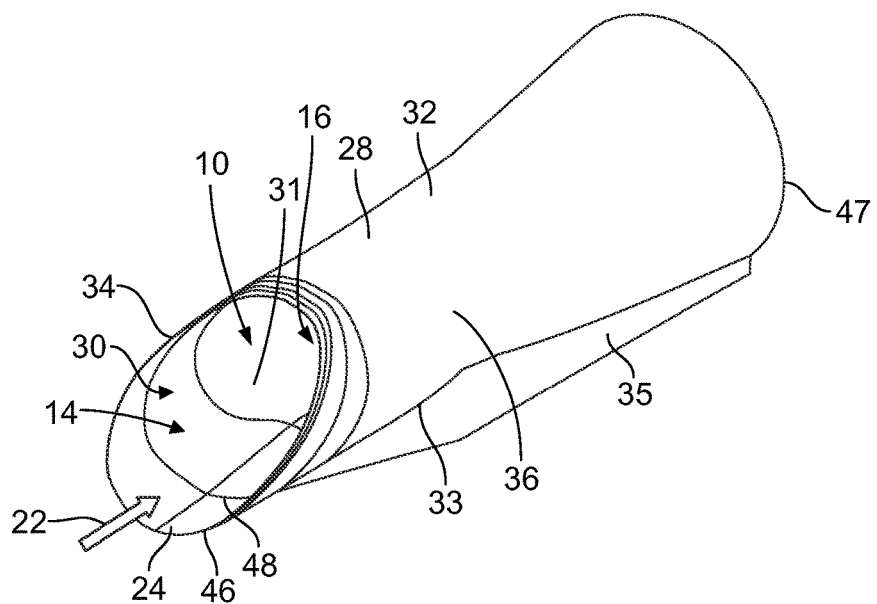
FIG. 2 is a diagrammatic representation of the perspective view of the flow inlet of FIG. 1 detached from the aircraft and the engine.

FIGS. 1 and 2 illustrate perspective views of an embodiment of a supersonic flow inlet 10. The supersonic flow inlet 10 forms an interior surface of a cowl 28. The supersonic flow inlet 10 may comprise an external-compression supersonic inlet. In another embodiment the supersonic flow inlet 10 may comprise a mixed-compression supersonic inlet. The supersonic flow inlet 10 may comprise a portion of an aircraft 12.

The cowl 28 may be made of composite materials. In other embodiments, the cowl 28 may be made of other materials such as titanium, steel, aluminum, or other types of materials. The cowl 28 is at least partially elliptical as viewed in the stream-wise direction. The cowl 28 comprises a first surface 32 defining a crown, a second surface 33 defining a keel, and side surfaces 34 and 36 attached to and extending between opposed ends of the first surface 32 and opposed ends of the second surface 33. The side surfaces 34, 36 define maximum half breadths of the cowl 28 which are defined at the maximum width of the cowl 28. A highlight 46 is defined at the forward end of the cowl 28, and an aft end 47 is defined at the rearward end of the cowl 28. The highlight 46 angles rearwardly from the keel to the crown. A diffuser 35 may be attached to the second surface 33 of the cowl 28.

Figure 3:
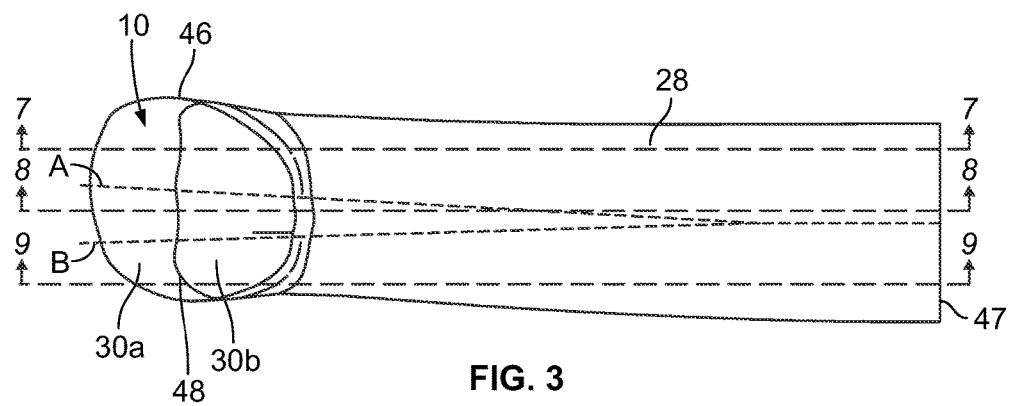
FIG. 3 is a diagrammatic representation of a top plan view of the flow inlet.
Figure 4:
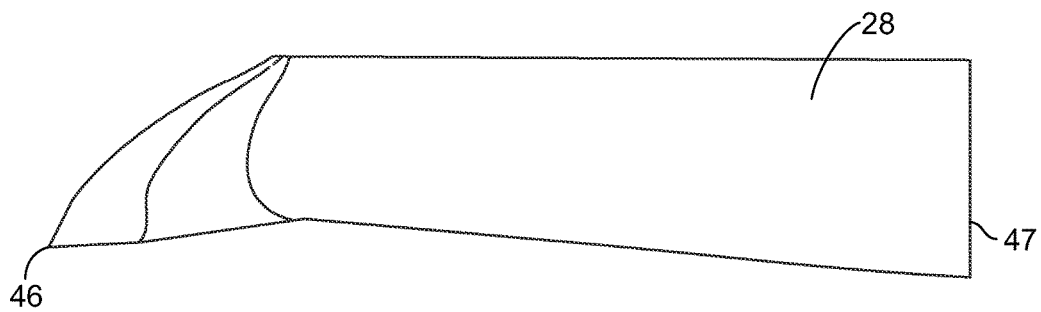
FIG. 4 is a diagrammatic representation of a side elevation view of the flow inlet in a toed out position along axis A of FIG. 3.
Figure 6:
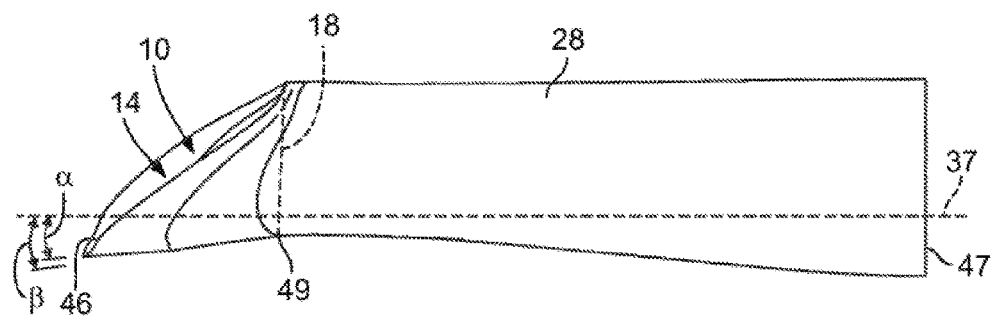
FIG. 6 is a diagrammatic representation of a side elevation view of the flow inlet in a toed in position along axis B of FIG. 3.

FIGS. 4 and 6 illustrate side elevation views of the supersonic flow inlet 10 of FIGS. 1 and 2. In FIG. 4, the supersonic flow inlet 10 is shown in a 2 degree toed out position along axis A of FIG. 3, which is the position the supersonic flow inlet 10 is positioned during use on parts of the aircraft 12. The supersonic flow inlet 10 may also be positioned in a 2 degree toed in position during use on parts of the aircraft 12. The supersonic flow inlet 10 is also scarfed during use. FIG. 6 illustrates a side elevation view of the supersonic flow inlet 10 along the X-Z plane, axis B, of FIG. 3.

As shown in FIG. 1, the supersonic flow inlet 10 comprises a supersonic compression section 14 attached to a subsonic diffusion section 16 at a throat 18 (see FIG. 6). The throat 18 is located at the aft most point of the highlight 46. The throat 18 is planar as shown in FIG. 6. The supersonic flow inlet 10 has a curved upper duct 26 which extends from the highlight 46 to the aft end 47 of the cowl 28. As shown in FIG. 2, the supersonic compression section 14 is configured to compress a free stream airflow 22, when the airflow 22 is in a supersonic condition, as it flows from a beginning entrance 24 of the supersonic compression section 14, through the supersonic compression section 14, and to the throat 18 (see FIG. 6) at which the subsonic diffusion section 16 begins. The subsonic diffusion section 16 is connected to an engine 20. The engine 20 may comprises a gas turbine engine with a BPR (bypass ratio) value of 3.5, an OPR (overall pressure ratio) of 24, and a RIT (burner exit temperature) of 2900 degrees F. In other embodiments, the engine 20 may comprise a gas turbine engine with a range of BPR values of 1 to 16, OPR values of 14 to 80 and RIT values of 2,000 to 3,500 F, or a ramjet, ducted rocket, scramjet, or other type of air-breathing engine.

Figure 5:
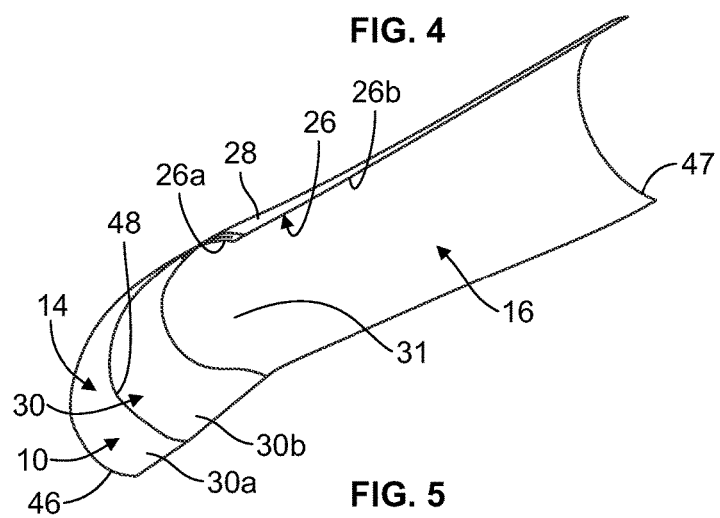
FIG. 5 is a diagrammatic representation of a cut-away perspective view of the flow inlet of FIG. 4.

The supersonic compression section 14 is formed by a forward portion 26a of the curved upper duct 26 and a supersonic compression ramp 30. The forward portion 26a and the supersonic compression ramp 30 form a continuous perimeter around the supersonic compression section 14 of the flow inlet 10. The supersonic compression section 14 is at least partially elliptical as viewed in the stream-wise direction. The supersonic compression ramp 30 is divided into a first compression ramp section 30a and a second compression ramp section 30b (see FIGS. 4-6). The first compression ramp section 30a extends between the highlight 46 and the second ramp compression section 30b. The second compression ramp section 30b extends between the first compression ramp section 30a and the throat 18. A first turn 48 is provided between the first compression ramp section 30a and the second compression ramp section 30b. A second turn 49 is provided between the second compression ramp section 30b and the throat 18. The first and second turns 48 and 49, respectively, are configured to provide oblique shock waves in the airflow 22 as the airflow 22 flows through supersonic compression section 14 to compress the airflow 22. The cross-section area (defined as the streamwise cross-section area between the upper duct 26 and the supersonic compression ramp 30) is smallest at the throat 18 (see FIG. 6).

Figure 7:
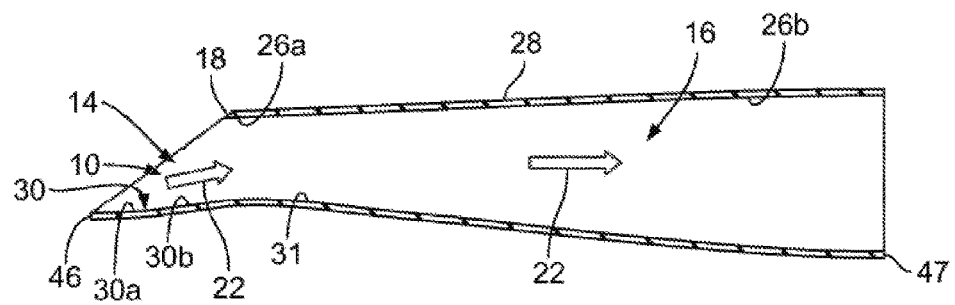
FIG. 7 is a diagrammatic representation of a cross-sectional view of the flow inlet along line 7-7 of FIG. 3.
Figure 8:
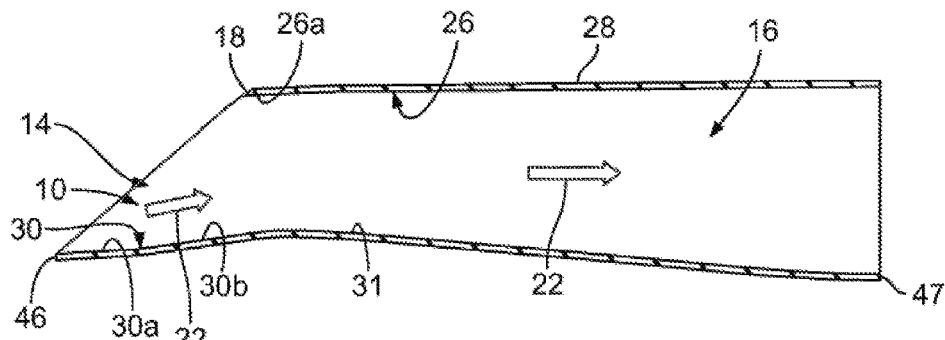
FIG. 8 is a diagrammatic representation of a cross-sectional view of the flow inlet along line 8-8 of FIG. 3.
Figure 9:
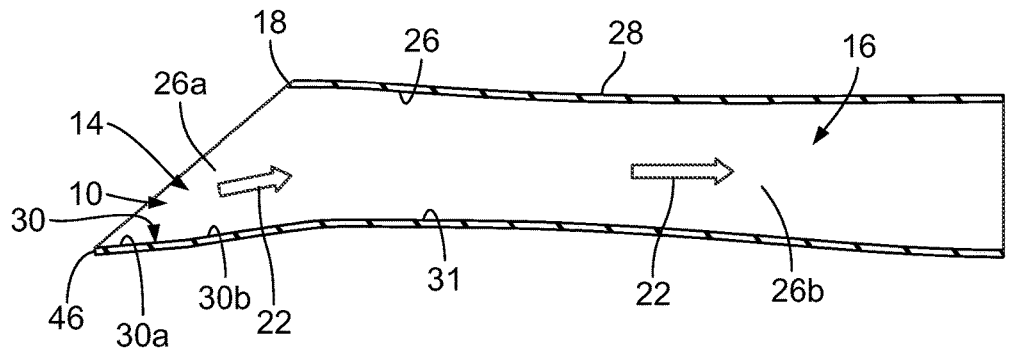
FIG. 9 is a diagrammatic representation of a cross-sectional view of the flow inlet along line 9-9 of FIG. 3.

The first compression ramp section 30a extends along an approximately 180 degree arc along the supersonic flow inlet 10, and extends continuously from an interior point aligned with the maximum half breadth of the side surface 34, along the interior of the second surface 33 of the cowl 28, to an interior point aligned with the maximum half breadth of the side surface 36. The first compression ramp section 30a may extend past the interior point aligned with the maximum half breadth of each side surface 34, 36. The first compression ramp section 30a is partially elliptical, having a radius of curvature. As shown in the cross-sectional views of FIGS. 7-9, at all points around the perimeter of the first compression ramp section 30a, the first compression ramp section 30a extends linearly from the highlight 46 to the second compression ramp section 30b. The second compression ramp section 30b extends along an approximately 180 degree arc along the supersonic flow inlet 10, and extends continuously from an interior point aligned with the maximum half breadth of the side surface 34, along the interior of the second surface 33 of the cowl 28, to an interior point aligned with the maximum half breadth of the side surface 36. The second compression ramp section 30b may extend past the interior point aligned with maximum half breadth of each side surface 34, 36. The second compression ramp section 30b is partially elliptical, having a radius of curvature. As shown in the cross-sectional view of FIGS. 7-9, at all points around the perimeter of the second compression ramp section 30b, the second compression ramp section 30b extends linearly from the first compression ramp section 30a to the throat 18.

As shown in FIG. 6, the first compression ramp section 30a is angled at an angle $\alpha$ relative to a centerline 37 of the cowl 28; the second compression ramp section 30b is angled at an angle $\beta$ relative to the centerline 37. Angle $\alpha$ is different than angle $\beta$, and angle $\alpha$ is less than angle $\beta$. Angle $\alpha$ may be within the range of about 2 degrees to about 4 degrees; angle $\beta$ may be within the range of about 3 degrees to about 7 degrees; however, angle $\alpha$ is always less than angle $\beta$.

The length of the supersonic compression ramp 30 varies as the supersonic compression ramp 30 extends around the perimeter of the supersonic flow inlet 10. The length is defined as the distance from the highlight 46 to the throat 18. The supersonic compression ramp 30 preferably has a length over height of 1 to 3. The supersonic compression ramp 30 is longer at the second surface 33 than at the maximum half breadth. The first compression ramp section 30a has a length which is shorter than the length of the second compression ramp section 30b. The length of the first compression ramp section 30a is defined as the distance between the highlight 46 and the second compression ramp section 30b along the various points of the first compression ramp section 30a. The length of the second compression ramp section 30b is defined as the distance between the first compression ramp section 30a and the throat 18 along the various points of the second compression ramp section 30b. The compression ramp sections 30a, 30b have a length ratio (the absolute length in the X direction) of approximately 1.7 to 1. This length ratio is substantially consistent around the curvature of the supersonic compression ramp 30 around the supersonic flow inlet 10. For example, at the keel of the supersonic compression ramp 30, the first compression ramp section 30a may have a length of 27 inches and the second compression ramp section 30b may have a length of 45 inches.

As a result, the supersonic flow inlet 10 effectively has more compression area than prior art ramps because the supersonic compression ramp 30 extends over an approximately 180 degree arc along the supersonic flow inlet 10. Since the supersonic compression ramp 30 does not include any flat panels, this results in reduced pressure loads and reduced circumferential area at the supersonic flow inlet 10. As a result, this supersonic flow inlet 10 has lower drag than typical supersonic inlets.

Since the supersonic compression ramp 30 wraps around an approximately 180 degree arc along the supersonic flow inlet 10, this results in a crown height, that is the minimum distance between the supersonic compression ramp 30 and the highlight 46, which is less than a conventional flat ramp. This enables a simpler subsonic diffusion section 16.

The subsonic diffusion section 16 is configured to receive the airflow 22 which has been compressed by the supersonic compression section 14 and is configured to diffuse the airflow 22 into a subsonic condition prior to entering the engine 20. The subsonic diffusion section 16 comprises a rearward portion 26b of the upper duct 26 and a subsonic diffusion ramp 31. The rearward portion 26b and subsonic diffusion ramp 31 form a continuous perimeter around the supersonic flow inlet 10. The subsonic diffusion section 16 extends from the throat 18 to the aft end 70 of the cowl 28. The supersonic flow inlet 10 may be at least partially elliptical in the subsonic diffusion section 16. The subsonic diffusion ramp 31 may be at least partially elliptical comprising 50% of an ellipse. In other embodiments, the subsonic diffusion ramp 31 may comprise any percentage of an ellipse, or may be in varying shapes. In still other embodiments, the upper arcuate duct 26 and the subsonic diffusion ramp 31 may vary in shape. In yet other embodiments, the diffusion ramp 31 may be eliminated.

The cross-section of the supersonic compression section 14 is largest at the beginning entrance 24 and is smallest at the throat 18. The cross-section of the subsonic diffusion section 16 is smallest at the throat 18 and is largest at the end 70.

At the interior points aligned with the maximum half breadths, the second compression ramp section 30b merges smoothly with the upper arcuate duct 26 which forms part of the subsonic diffusion section 16. Along a width of the subsonic diffusion ramp 31, the second compression ramp section 30b merges smoothly with the subsonic diffusion ramp 31. As a result, the supersonic compression ramp 30 merges smoothly with the upper arcuate duct 26 and with the subsonic diffusion ramp 31.

The configuration of the supersonic flow inlet 10 provides many benefits over one or more of the existing supersonic inlets such as providing high performance, providing high efficiency, providing low distortion, providing high recovery, providing low external drag, and being of low weight allowing for a reduction in size of the aircraft 12 or an increase in range of the aircraft 12 over one or more existing aircraft which utilize one or more of the existing supersonic inlets. The airflow 22 uniformly flows in the cross-section area of the supersonic compression section 14, and the airflow 22 uniformly flows in the cross-section area of the subsonic diffusion section 16, and the airflow 22 remains near-uniform at the end 70 of the subsonic diffusion section 16. The supersonic flow inlet 10 provides a low external drag due to the reduction in external surface area of the supersonic flow inlet 10. Use of the supersonic flow inlet 10 allows for an improvement in range of the aircraft 12.

Figure 10:
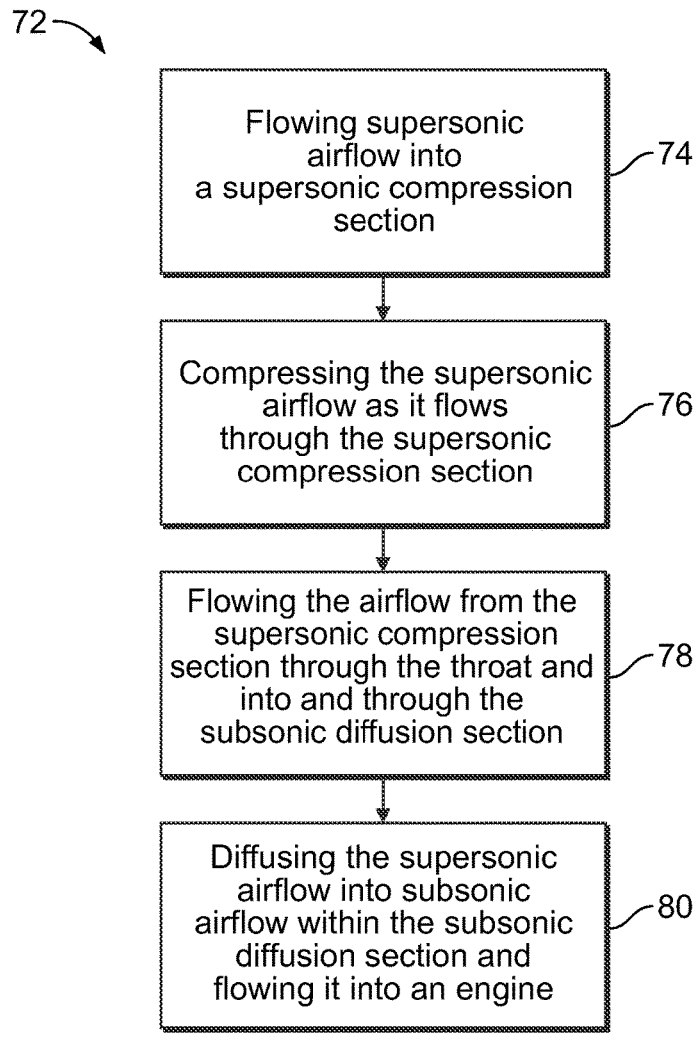
FIG. 10 is a flowchart of an embodiment of a method of compressing and diffusing airflow using the flow inlet.

FIG. 10 is a flowchart of one embodiment of a method 72 of compressing and diffusing the airflow 22. In step 74, the airflow 22 is flowed into the supersonic compression section 14. In step 76, the airflow 22 is compressed as it flows through the supersonic compression section 14. The airflow 22 flows over the compression ramp sections 30a, 30b as it flows through the supersonic compression section 14 with the turn 48 providing a shock to the airflow 22. In step 78, the airflow 22 flows from the supersonic compression section 14 through the throat 18 and into and through the subsonic diffusion section 16. The airflow 22 flows through the throat 18 with the turn 49 providing a shock to the airflow 22. In step 80, the airflow 22 is diffused into subsonic airflow within the subsonic diffusion section 16 and subsequently flows into the engine 20.

While a particular embodiment is illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

The invention claimed is:

1. An apparatus comprising:
a cowl that includes a flow inlet formed on an interior surface of the cowl, the flow inlet comprising:
a curved upper duct extending from a forward end of the cowl to an aft end of the cowl; and
a supersonic compression section attached to a subsonic diffusion section at a throat, the supersonic compression section comprising:
a forward portion of the curved upper duct; and
a compression ramp positioned opposite the forward portion of the curved upper duct, the compression ramp having an at least partially non-circular elliptical profile as viewed in a stream-wise direction, wherein the at least partially non-circular elliptical profile of the compression ramp extends along an approximately 180 degree arc along the interior surface.

2. The apparatus of claim 1, wherein the forward portion and the compression ramp form a continuous perimeter in the supersonic compression section.

3. The apparatus of claim 1, wherein the compression ramp includes first and second compression ramp sections, the compression ramp sections being separated from each other by a turn configured to provide a shock to airflow flowing through the flow inlet.

4. The apparatus of claim 3, wherein the first compression ramp section is linear in the stream-wise direction along all points of the arc, and the second compression ramp section is linear in the stream-wise direction along all points of the arc.

5. The apparatus of claim 4, wherein at each point along the arc, the first compression ramp section is angled at a first angle relative to a centerline of the cowl and the second compression ramp section is angled at a second angle relative to the centerline, the first and second angles being different.

6. The apparatus of claim 3, wherein the first compression ramp section is shorter in length than a length of the second compression ramp section.

7. The apparatus of claim 1, wherein said subsonic diffusion section comprises a portion of the curved upper duct and a diffusion ramp.

8. The apparatus of claim 7, wherein the diffusion ramp is at least partially elliptical.

9. The apparatus of claim 7, wherein the compression ramp merges with the curved upper duct and with the diffusion ramp.

10. An aircraft comprising:
a cowl that includes a supersonic flow inlet formed on an interior surface of the cowl, the supersonic flow inlet comprising:
a curved upper duct extending from a forward end of the cowl to an aft end of the cowl; and
a supersonic compression section attached to a subsonic diffusion section at a throat, the supersonic compression section comprising:
a forward portion of the curved upper duct; and
a compression ramp positioned opposite the forward portion of the curved upper duct, the compression ramp having an at least partially non-circular elliptical profile as viewed in a stream-wise direction, wherein the at least partially non-circular elliptical profile of the compression ramp extends along an approximately 180 degree arc along the interior surface; and
an engine disposed downstream of the subsonic diffusion section.

11. The aircraft of claim 10, wherein the forward portion and the compression ramp form a continuous perimeter in the supersonic compression section.

12. The aircraft of claim 10, wherein the compression ramp includes first and second compression ramp sections, the compression ramp sections being separated from each other by a turn configured to provide a shock to airflow flowing through the flow inlet.

13. The aircraft of claim 12, wherein the first compression ramp section is linear in the stream-wise direction along all points of the arc, and the second compression ramp section is linear in the stream-wise direction along all points of the arc.

14. The aircraft of claim 13, wherein at each point along the arc, the first compression ramp section is angled at a first angle relative to a centerline of the cowl and the second compression ramp section is angled at a second angle relative to the centerline, the first and second angles being different.

15. The aircraft of claim 13, wherein the first compression ramp section is shorter in length than a length of the second compression ramp section.

16. The aircraft of claim 10, wherein the compression ramp merges with the curved upper duct and with the subsonic diffusion section.

17. A method of diffusing airflow comprising:
flowing airflow into a supersonic compression section of a flow inlet formed on an interior surface of a cowl, the flow inlet comprising:
a curved upper duct extending from a forward end of the cowl to an aft end of the cowl; and
a supersonic compression section attached to a subsonic diffusion section at a throat, the supersonic compression section comprising:
a forward portion of the curved upper duct; and
a compression ramp positioned opposite the forward portion of the curved upper duct, the compression ramp having an at least partially non-circular elliptical profile as viewed in a stream-wise direction, wherein the at least partially non-circular elliptical profile of the compression ramp extends along an approximately 180 degree arc along the interior surface; and
compressing the airflow as it flows through the flow inlet.

18. The method of claim 17, further comprising flowing the airflow from the supersonic compression section into and through the subsonic diffusion section, and diffusing the airflow into subsonic airflow within the subsonic diffusion section.

19. The apparatus of claim 1, wherein a concave surface of the compression ramp having the at least partially non-circular elliptical profile is in a facing relationship with the forward portion of the curved upper duct.

20. The aircraft of claim 10, wherein a concave surface of the compression ramp having the at least partially non-circular elliptical profile is in a facing relationship with the forward portion of the curved upper duct.

* * * * *